United States Patent
Benne

(10) Patent No.: US 6,696,690 B2
(45) Date of Patent: Feb. 24, 2004

(54) METHOD AND APPARATUS TO CORRECT FOR THE TEMPERATURE SENSITIVITY OF PRESSURE SENSITIVE PAINT

(75) Inventor: Michael E. Benne, St. Paul, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/022,590

(22) Filed: Dec. 17, 2001

(65) Prior Publication Data

US 2003/0111615 A1 Jun. 19, 2003

(51) Int. Cl.$^7$ ............................ G01N 21/64; G01K 11/12
(52) U.S. Cl. .......................... 250/458.1; 374/161
(58) Field of Search ................. 250/458.1, 459.1, 250/461.1; 374/161, 162

(56) References Cited

U.S. PATENT DOCUMENTS

| | | | |
|---|---|---|---|
| 5,186,046 A | | 2/1993 | Gouterman et al. |
| 5,302,025 A | * | 4/1994 | Kleinerman ................ 374/161 |
| 5,341,676 A | | 8/1994 | Gouterman et al. |
| 5,359,887 A | | 11/1994 | Schwab et al. |
| 5,517,313 A | * | 5/1996 | Colvin, Jr. ............... 250/458.1 |
| 5,560,712 A | * | 10/1996 | Kleinerman ................ 374/161 |
| 5,612,492 A | | 3/1997 | Schwab et al. |
| 5,731,995 A | | 3/1998 | Benne et al. |
| 5,818,057 A | | 10/1998 | Buck |
| 5,911,952 A | * | 6/1999 | Tsuji ....................... 250/458.1 |

FOREIGN PATENT DOCUMENTS

JP   11344388 A   6/1998

OTHER PUBLICATIONS

M. A. Woodmansee and J. C. Dutton, Methods for Treating Temperature–Sensitivity Effects of Pressure–Sensitive Paints, Jan. 6–10, 1997, pp. 1–15.

Dr. Martin J. Morris, Use of Pressure–Sensitive Paints in Low–Speed Flows, pp. 31.1–31.10, 1995.

What is Pressure Sensitive Paint? http://www.pitotech.com.tw/k4h61.htm, updated Dec. 17, 1999.

Shad D. Torgerson, Tianshu Liu and John P. Sullivan, Use of Pressure Sensitive Paints in Low Speed Flows, pp. 1–21, 1996.

Rabindra D. Mehta, and Owen C. Brown, Low–Speed Pressure–Sensitive Paint Research, Aeronautics and Space Transportation Technology Enterprise, http://atrs.arc.nasa.gov/rat/1997/afford23.html.

Gary S. Vasilash, Aero Meets Auto, Automotive Design & Production, http://www.auto field guide.com/articles/080101.html.

* cited by examiner

*Primary Examiner*—G. Bradley Bennett
(74) *Attorney, Agent, or Firm*—Harness, Dickey & Pierce P.L.C.

(57) ABSTRACT

A method and apparatus for correcting for the temperature sensitivity of pressure sensitive paint using two layers of paint: one that is sensitive to both pressure and temperature and one that is sensitive to only temperature changes. A temperature sensitive paint layer or film is placed on a model to be tested in a wind tunnel for pressure changes over the surface of the model. The first film is responsive to temperature changes and has a magnitude of luminosity depending upon the temperature of the ambient air. Placed over the temperature film is a pressure sensitive paint or film that is sensitive primarily to pressure changes, but also to temperature changes, and produces a magnitude of luminosity depending upon the change in both temperature and pressure. The pressure paint layer is transparent to the luminescence of the temperature layer and a measurement of the luminosity of the temperature layer and the pressure layer is taken. The pressure layer luminosity is corrected for the temperature layer luminosity, thereby enabling a true pressure reading to be determined by comparing the magnitude of luminescence of both the temperature layer and the pressure layer.

31 Claims, 1 Drawing Sheet

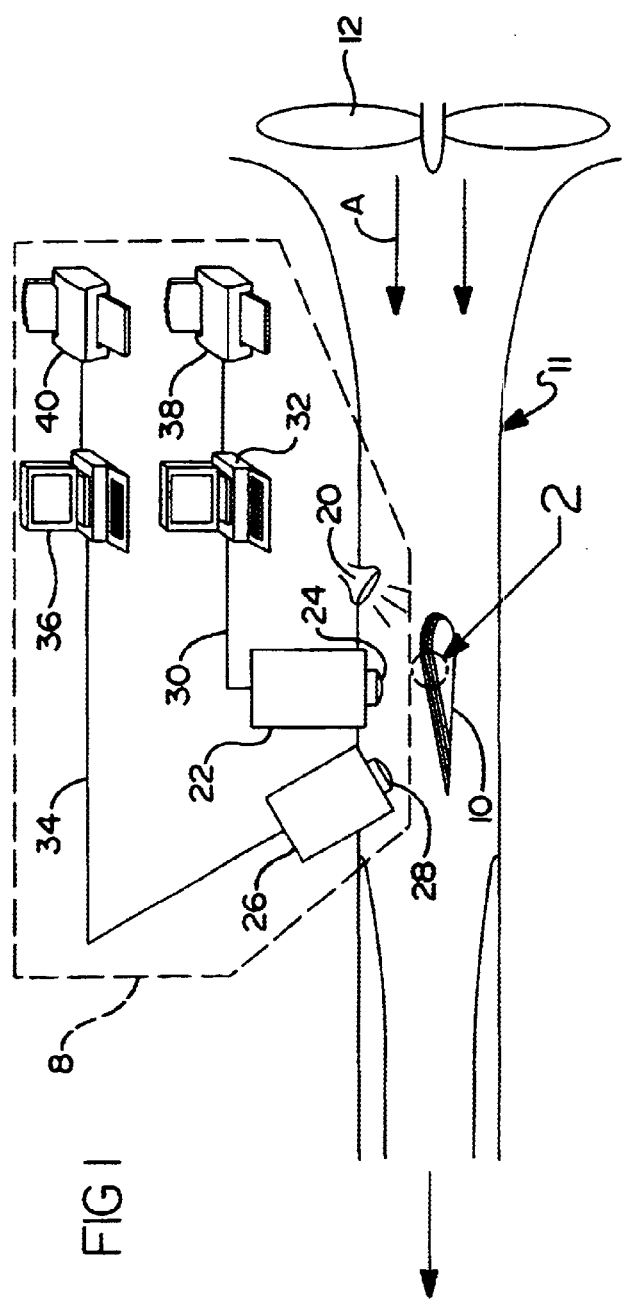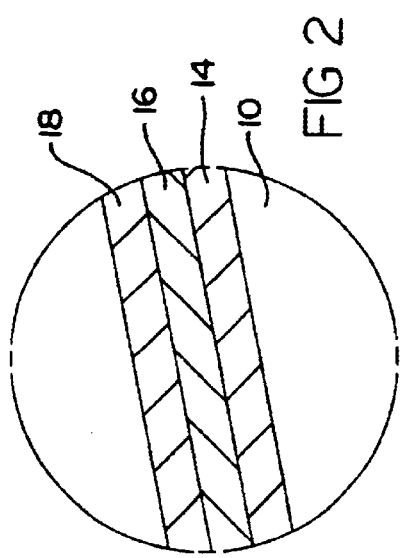

United States Patent US 6,696,690 B2

METHOD AND APPARATUS TO CORRECT FOR THE TEMPERATURE SENSITIVITY OF PRESSURE SENSITIVE PAINT

FIELD OF THE INVENTION

The present invention relates to pressure sensitive paints, and more particularly to a method and apparatus of correcting for the temperature sensitivity of pressure sensitive paints.

BACKGROUND OF THE INVENTION

Many vehicles, such as automobiles and aircraft, have to operate in an atmosphere of dense gas. Therefore, it is highly desirable to optimize the aerodynamics of these vehicles. Furthermore, with certain vehicles such as aircraft, certain aerodynamic interactions must be known to assure that the aircraft will perform properly and be capable of being flown in a controlled manner. To this end, several methods have been used to measure pressure on the surface of models of different vehicles to assure that they will be able to operate efficiently and properly during travel. Wind tunnels are often used to simulate a vehicle traveling at a particular speed through the atmosphere. Once the model is placed in the wind tunnel, air is moved at a particular speed over the model to test how the model reacts to the wind speed. One particular measurement is the pressure produced over the various surfaces of the model during the tests in the wind tunnel. To measure these different pressure points, many techniques have been developed.

Generally, wind tunnels use several mechanical devices to measure the pressure changes along the surfaces of the models placed in the wind tunnel. Each of these numerous mechanical devices are affixed to different electrical leads, which electrical leads are coupled to a computer to produce a representation of the pressure changes produced on the model by the wind in the wind tunnel. These systems are often cumbersome, time consuming, and hard to set up and take down for each model being tested.

Other methods of detecting pressure changes include pressure sensitive paints (PSP). These PSPs are able to luminesce at a particular wavelength when pressure is applied thereto. Generally, PSPs luminesce when a particular type of light energy is applied to them at a particular wavelength. Also, the PSPs are oxygen permeable. In the wind tunnel, the PSP, being oxygen permeable, receives a particular amount of oxygen depending upon the pressure being applied to an area. When a particular wavelength of light is applied to the PSP, it luminesces. If oxygen is in the matrix of the PSP, the oxygen absorbs a certain amount of the luminescent energy that would otherwise be emitted, thereby changing the luminescence of the PSP depending upon the amount of oxygen that is absorbed into the PSP layer. Therefore, a pressure of oxygen is determined and interpreted therefrom. A general pressure of the air around the particular area of the model being measured is determined from the known concentration of oxygen. Often the PSPs are sensitive not only to pressure, but also temperature. Therefore, temperature can effect the degree of luminescence from the PSP. Due to this temperature sensitivity, pressure cannot be accurately determined from the luminescence of the PSP alone.

Several methods have been attempted to correct for the temperature sensitivity of PSPs with only marginal success. One method is to simply shorten the amount of time between when measurements are taken. That is, the time between a zero or initial reference, that being when no wind or pressure is being applied to the model, and when the maximum amount of wind pressure is being applied to the model. However, this does not actually correct for temperature, but rather simply reduces the amount of temperature change that occurs and reduces the error of the PSP to one that is acceptable for the tests.

Other methods have attempted to mix several different sensors into a single film wherein each is affected by temperature, pressure, or other factors. The mixing of all of the phosphorescence species into a singular film, however, has reduced the temperature error of the PSP only marginally. Furthermore, it is difficult to provide each of the particular phosphorescent species in a singular film since it increases the effort and cost necessary to produce such a film.

Additionally, attempting to correct for the temperature change through data conversion after the test data has been taken during a test has been tried. Again, this method is long and arduous and only corrects for a certain amount of the temperature related error. Additionally, this method is only marginally helpful in correcting for the temperature change in the PSPs.

SUMMARY OF THE INVENTION

The present invention relates to a system that can adjust or take account of the temperature sensitivity of a pressure sensitive paint to produce a measurement that is nearly error free due to temperature sensitivity of the pressure sensitive paint.

A first preferred embodiment of the present invention includes a system for detecting at least two physical characteristics near a surface being tested. A first luminescent film, capable of emitting light having a wavelength in a first discrete range, is placed on the surface. A second luminescent film, capable of emitting light having a second wavelength in a second discrete range, is placed over the first film. A radiation source which emits radiation able to excite the first luminescent film and the second luminescent film is focused on the films. An analysis system detects the brightness of the light emitted by the first luminescent film and the brightness of the light emitted by the second luminescent film. The first luminescent film and the second luminescent film are placed on the surface substantially coplanar and the first luminescent film is substantially transparent to the light emitted from the second luminescent film.

A second preferred embodiment of the present invention comprises a method of more accurately determining a pressure on a surface being tested. The method comprises measuring the brightness of light emitted by a first film sensitive to temperature, which covers the surface being tested. Additionally, the brightness of light emitted by a second film, which is sensitive to both pressure change and temperature, and which covers the first film, is measured. At least a first measurement of the brightness of light emitted by each of the films is taken. Then the surface is made to experience a pressure and temperature change. At least a second measurement of the brightness of light emitted by each of the films is taken. Finally, an accurate determination of the pressure experienced by the surface is obtained by comparing the first measurements and the second measurements.

A third preferred embodiment of the present invention includes a system to determine the pressure over an area of a surface. A member under test has a first film applied so as to surround the member, wherein the first film comprises a sensor that is adapted to emit light at a first wavelength. A second film is placed over the first film to surround the first film. The second film comprises a second sensor adapted to emit light at a second wavelength. The first film is transparent to the second wavelength. A test is performed and each sensor in each film emits light at a particular brightness which is measured.

BRIEF DESCRIPTION OF THE DRAWINGS

Still other advantages of the present invention will become apparent to those skilled in the art after reading the following specification and by reference to the drawings in which:

FIG. 1 shows a schematic representation of a preferred embodiment of a system of the present invention to measure the brightness of light emitted by two films placed on a model in a wind tunnel; and FIG. 2 an enlarged view of the area represented by 2 in FIG. 1.

DETAILED DESCRIPTION OF THE PREFERRED EMBODIMENTS

With reference to FIG. 1, a pressure sensing system (PSS) 8 in accordance with the present invention is generally shown. The PSS 8 is used to analyze a model 10 placed in a wind tunnel 11. Model 10 may form any structural member or other component, however, in one example it comprises a portion of a wing of an aircraft. A fan 12 or similar device produces an airflow in the direction of arrow A in the wind tunnel 11. The PSS 8 makes use of layers of film, generally paints or other materials suspended in a polymer binder or matrix, which are coated on the model 10. With specific reference to FIG. 2, the layers generally include a primer layer 14 which assists in the adhesion of the other layers to the model 10 itself. A commonly used primer is WAL-2 produced by Boeing, Inc. It will be understood that any suitable primer may be used. Also, if the remaining films or layers provide sufficient adhesion between the layers and the model 10 itself, a primer layer 14 would not be necessary. Next, a layer of temperature sensitive paint (TSP) 16 is placed over the primer layer 14. The TSP layer 16 changes luminescence or brightness depending upon the temperature of the ambient air surrounding the model 10. Finally, a layer of pressure sensitive paint (PSP) 18 is layered on top of the TSP layer 16. The PSP layer 18 changes luminescence or brightness primarily depending upon the air pressure placed on the PSP layer 18, however, the PSP layer 18 changes luminescence depending upon temperature.

Various PSPs and TSPs or films are generally known in the art, such as those disclosed in Woodmansee, M. A., and J. C. Dutton, *Methods for Treating Temperature Sensitivity Effects of Pressure-Sensitive Paints,* 35th Aerospace Sciences Meeting & Exhibit, 1997, hereby incorporated by reference. Generally, the PSP layer 18 must be permeable to the surrounding atmosphere and able to absorb oxygen. As a general description, the PSP layer 18 luminesces when it is illuminated or irradiated with a particular wavelength light. The lumninescence of the PSP layer 18 is known or measured in this initial state when the PSP layer 18 is only subjected to irradiation. The active material or sensor in the PSP layer 18 is excited and emits a photon of light, creating a light signal, centered at a particular wavelength different than the wavelength of the illumination source. The sensor may comprise any chemical species which is able to be excited and emits radiation upon return to a ground or unexcited state. Preferably, the radiation emitted is a photon.

When oxygen is present in the PSP layer 18, then the oxygen molecules absorb a certain amount of the energy being emitted by the sensor in the PSP layer 18. The change in luminescence correlates to the concentration of oxygen present in the PSP layer 18. The higher the concentration of oxygen, the lower the luminescence of the sensor in the PSP layer 18. As pressure increases in the surrounding atmosphere, more and more oxygen is forced into the PSP layer 18. Therefore, pressure may be measured by determining the lack of luminescence of the sensor from the PSP layer 18 which depends on the concentration of oxygen.

The TSP layer 16 also includes a sensor which is able to emit a photon at a wavelength, and produce a light signal, different than the wavelength emitted from the sensor in the PSP layer 18. The TSP layer 16 also emits the photon when the sensor in the TSP layer 16 is excited by a radiation source. The amount of luminescence in the TSP layer 16 depends upon the ambient temperature.

The Pressure Sensing System (PSS) 8 is implemented by first placing the model 10 in the wind tunnel 11 after the appropriate layers have been placed on the model 10. The PSS 8 includes an illuminating or irradiating source 20 that can illuminate the model 10 and provides the optical energy that excites the sensors in both the TSP layer 16 and the PSP layer 18. The illuminating source 20, for example, may be a light that appears generally blue and has a wavelength centered at about 450 nanometers. It will be understood that any suitable illuminating source, depending upon the sensors in the TSP layer 16 or the PSP layer 18, may be used. Additionally, the illuminating source 20 need not emit visible wavelengths depending upon the sensors of the particular TSP layer 16 or the PSP layer 18.

Referring further to FIG. 1, a PSP camera 22 and a TSP camera 26 are both aimed at the model 10. The PSP camera 22 includes a PSP filter 24, while the TSP camera 26 includes a TSP filter 28. The wavelengths of the photons emitted from the TSP layer 16 differ from those emitted by the PSP layer 18. Therefore, the PSP filter 24 filters all wavelengths except for the wavelengths being emitted by the PSP layer 18, while the TSP filter 28 filters all wavelengths except for the wavelengths being emitted by the TSP layer 16. Therefore, the PSP camera 22 only registers the luminescence or brightness of the light emitted from the PSP layer 18, while the TSP camera 26 only measures the luminescence or brightness of the light emitted by the TSP layer 16.

The PSP camera 22 produces a signal based upon the magnitude of the luminescence of the PSP layer 18 and transmits the signal along lead 30 to a PSP processor 32. The TSP camera 26 produces a signal depending upon the magnitude of the luminescence of the TSP layer 16 and transmits the TSP signal along lead 34 to the TSP processor 36. The PSP processor 32 processes the signal transmitted along lead 30 and determines the magnitude of the luminescence being emitted by the PSP layer 18 and calculates a pressure related to the luminescence being emitted by the PSP layer 18. The pressure calculated based upon the luminescence is then displayed on a PSP output device 38, such as a suitable display system. Similarly, a TSP processor 36 determines a temperature based upon the luminescence of the TSP layer 16 and then displays a temperature based upon the luminescence on a TSP output device 40. Output device 40 may also comprise a suitable display system.

Since the luminescence of the PSP layer 18 also depends upon the temperature change of the atmosphere or the model 10 in the wind tunnel 11 not all of the luminescence being emitted by the PSP layer 18 correlates to the actual pressure being experienced by that particular area of the model 10. The TSP layer 16, however, is not affected by pressure and its luminescence only relates to the actual temperature change that is affecting the sensors in the TSP layer 16. Therefore, the output displayed on the TSP output device 40 is used to correct the output displayed on the PSP output device 38 to insure an accurate depiction of the pressure being experienced by the PSP layer 18.

A preferred method of the present invention for determining the absolute or real pressure being experienced by the model 10 may proceed as generally described herein. When there is no wind being produced by the fan 12 in the wind tunnel 11, an initial reference illuminescence is determined using the PSP camera 22 and the TSP camera 26. The illuminating source 20 illuminates the TSP layer 16 and the PSP layer 18 such that the particular wavelengths associated with the respective sensors are emitted. The TSP layer 16 and PSP layer 18 both emit photons which are detected by the TSP camera 26 and the PSP camera 22, respectively. The cameras 22, 26 transmit the signals to the respective processors 32, 36 to determine the initial pressure and temperature measurements. These measurements are then output to the output devices 38, 40. In this way, an initial or reference illuminescence can be determined for both the PSP layer 18 and the TSP layer 16.

Hence, the initial reference point for the PSP layer 18 is known as $I_{ref, PSP}$ or $I_{ref, fl}$, and represents the luminescence recorded by the PSP camera 22 when no wind or pressure is being produced on the model 11 by the fan 12. Similarly, an initial reading for the TSP layer 16 is made and produces a point or reading $I_{ref, TSP}$ or $I_{ref, fl}$.

Then, once a pressure or wind is being produced on the model 10 by the fan 12, at least a second measurement is taken by the PSP camera 22. The on or test reading of the PSP camera 22 outputs a second value, designated $I_{on, PSP}$ or $I_{on, sl}$. Similarly, the TSP camera 26 produces at least a second signal when the fan 12 is on, wherein the corresponding second measurement is designated as $I_{on, TSP}$ or $I_{on, fl}$.

Therefore, an initial reference illumination signal and at least a second test or on signal so that the difference between the two can be determined. The change in luminescence of the TSP layer 16 is designated $I_{\Delta, TSP}$ or $I_{\Delta, fl}$. The change in luminescence of the PSP layer 18 is designated $I_{\Delta, PSP}$ or $I_{\Delta, sl}$. The difference in luminescence of the TSP layer 16 and the PSP layer 18 is compared to known illumination magnitudes to determine the respective temperature and pressure. Also, the PSP layer 18 has a known degree of luminescence due to the temperature it experiences. Since a temperature is recorded on the TSP output device 40, the illuminescence output recorded on the PSP output device 38 is corrected for the temperature recorded on the TSP output device 40 producing a corrected luminescence for the PSP layer 18 designated $I_{corr, PSP}$.

The cameras 22, 26 generally take a picture or scan the model 10 when readings are being taken. Therefore, the respective $I_{ref}$ and $I_{on}$ readings refer to a plurality of points or pixels in the picture taken. Each pixel in the picture is given a particular identifier and value which makes up the $I_{ref}$ and $I_{on}$ readings. Also, the correction for temperature change in the $I_{on, PSP}$ is corrected, or can be corrected, pixel by pixel with the corresponding $I_{on, TSP}$ readings. Therefore, a highly accurate pressure map indicating the pressure change can be created for the model 10, using a PSP layer 18 since the luminescence of the PSP layer 18 can be corrected for temperature. The pressure map allows one to determine a pressure at any point on the model 10.

The present invention is particularly useful for a low wind speed or pressure change experiment. In particular, in a low wind speed experiment, the pressure change may produce a degree of luminescence change in the PSP layer 18 that is similar to the luminescence change in the PSP layer 18 due to a temperature change. Therefore, being able to accurately correct for the temperature influence on the pressure reading is particularly useful in such a test. However, it will also be understood that the present invention is useful in high pressure or high wind speed experiments as well as to more accurately measure pressure changes.

Furthermore, it is the ability of the PSS 8 to provide knowledge of the discrete temperature change and discrete pressure change at each particular point on the model 10 that is particularly useful. The PSP layer 18 allows a measurement of a pressure change over the entire surface area of the model 10 being tested, since the pressure experienced by the model 10 may vary at different areas thereon. Similarly, the temperature may also change from one discrete area to another discrete area of model 10. Therefore, using the present invention allows both pressure and temperature readings to be made for each discrete area of the model 10. Furthermore, both temperature and pressure readings are made at the same time; thus there is no time difference error.

One skilled in the art will also understand that several modifications may be made to the PSS 8 of the present invention without departing from the spirit thereof. In particular, a single processing unit may be used to process the signal from both the PSP camera 22 and the TSP camera 26, which may similarly be displayed on a single output device. Additionally, more than one illuminating source may be used depending upon the wavelengths that would excite the active materials in either the PSP layer 18 or the TSP layer 16. One skilled in the art will also realize that a compound camera may include two lenses to receive both signals into a single compound unit, which may then transmit to either two separate processors or a single processor as mentioned above.

The description of the invention is merely exemplary embodiments in the present invention. One skilled in the art would readily recognize from such discussion and from accompanying drawings and claims that various changes, modifications, variations may be made therein without the spirit and scope of the invention

What is claimed is:

1. A system for detecting at least two physical characteristics near a surface of a component being tested, the system comprising:
   a first luminescent film adapted to be placed on an outer surface of the component, which is capable of emitting light having a first wavelength in a first discrete range;
   a second luminescent film adapted to be placed over said first luminescent film, which is capable of emitting light having a second wavelength in a second discrete range;
   a radiation source for emitting radiation able to optically excite said first luminescent film and said second luminescent film;
   an analysis system for detecting a first brightness of said first wavelength emitted by said first luminescent film and a second brightness of said second wavelength of light emitted by said second luminescent film;
   said first brightness representing a first physical characteristic being experienced by said surface of said component;

said second brightness representing a second physical characteristic being experienced by said surface of said component; and wherein said second luminescent film is substantially transparent to said light having a first wavelength emitted from said first luminescent film.

2. The system of claim 1, wherein said analysis system comprises:

a first analysis system, wherein said first analysis system measures said first brightness of said first wavelength of light; and a second analysis system, wherein said second analysis system measures said second brightness of said second wavelength of light.

3. The system of claim 2, wherein said first analysis system comprises:

a camera system including a filter such that only said first wavelength of light is detected, wherein said camera system produces a signal dependent upon said first brightness of said first wavelength of light;

a processing unit adapted to determine a magnitude of the first physical characteristic depending upon said signal produced by said camera system and to generate an output in accordance therewith; and an output device for displaying said output from said processing unit.

4. The system of claim 2, wherein said second analysis system comprises:

a camera system including a filter such that only said second wavelength of light is detected, wherein said camera system produces a signal dependent upon said second brightness of said second wavelength of light emitted;

a processing unit adapted to determine a magnitude of the second physical characteristic depending upon said signal produced by said camera system and to generate an output in accordance therewith; and an output device capable for displaying said output from said processing unit.

5. The system of claim 1, wherein:

said first luminescent film comprises a first sensor and said second luminescent film comprises a second sensor;

wherein each of said sensors comprise a chemical species which emits light having a wavelength within one of said discrete ranges of light; and wherein said first sensor is suspended in said first luminescent film and said second sensor is suspended in said second luminescent film.

6. The system of claim 5, wherein said first sensor emits said first wavelength of light at a brightness dependent upon a temperature experienced by said first luminescent film.

7. The system of claim 5, wherein said second wavelength of light has a brightness dependent upon a pressure incident on said second luminescent film.

8. A method for more accurately determining a pressure and a temperature experienced by a surface of a component, comprising:

covering the surface with a first layer of material which is sensitive to temperature;

covering the first layer of material with a second layer of material which is sensitive to a pressure exerted thereon;

creating a temperature change on said surface while exerting a pressure on said surface;

detecting a first degree of luminescence generated by said first layer of material in response to irradiating said first layer with optical radiation;

detecting a second degree of luminescence generated by said second layer of material in response to irradiating said second layer with said optical radiation;

determining, from said first degree of luminescence, a temperature being experienced by said surface; and determining, from said second degree of luminescence, a pressure being exerted on said surface.

9. The method of claim 8, wherein determining a pressure being exerted on a surface comprises determining a portion of the degree of luminescence of the second layer created by the temperature change based upon the degree of luminescence of the first layer.

10. The method of claim 9, wherein determining a pressure being exerted on a surface further comprises creating a pressure map of the component.

11. The method of claim 8, wherein creating a temperature change and exerting a pressure are substantially simultaneous in time and comprises:

placing the component in a wind tunnel; and operating the wind tunnel to exert said pressure.

12. A method for more accurately determining a pressure and a temperature experienced by a surface of a component under test, comprising:

a) covering the surface with a first layer which is temperature sensitive;

b) covering the first layer with a second layer which is pressure sensitive;

c) causing the first layer to emit a first light signal;

d) causing the second layer to emit a second light signal;

e) taking a first measurement of a brightness of the first light signal emitted by the first layer;

f) taking a first measurement of a brightness of the second light signal emitted by the second layer;

g) creating pressure and temperature changes incident on the surface;

h) taking a second measurement of a brightness of the first light signal emitted by the first layer;

i) taking a second measurement of a brightness of the second light signal emitted by the second layer; and j) interpreting the brightness of the light measured from the first layer depending upon the brightness of the light emitted by the second layer and extrapolating therefrom the pressure and the temperature being experienced by the surface.

13. The method of claim 12, wherein the step of taking a second measurement of the brightness of the first light signal and the step of taking a second measurement of the brightness of the second light signal occur substantially simultaneously.

14. The method of claim 12, wherein the step of taking a first measurement of the brightness of the first light signal comprises determining a first layer luminescence reference signal by taking the first measurement of the brightness of the first light signal before changing the pressure and temperature incident the first layer; and wherein the step of taking a second measurement of the brightness of the first light signal comprises determining a first layer luminescence test signal by taking the second measurement of the brightness of the first light signal after changing the pressure and temperature incident the first layer.

15. The method of claim 12, wherein the step of taking a first measurement of the brightness of the second light signal comprises determining a second layer luminescence reference signal by taking the first measurement of the brightness of the second light signal before changing the pressure and temperature incident the second layer; and wherein the step of taking a second measurement of the brightness of the second light signal comprises determining a second layer luminescence test signal by taking the second measurement of the brightness of the second light signal after changing the pressure and temperature incident the second layer.

16. The method of claim 12, wherein the step of interpreting the brightness of the light being emitted from the second layer depending upon the brightness of the light being emitted by the first layer includes:

a) comparing first layer luminescence reference signal with first layer luminescence test signal to determine the change in first layer brightness;

b) comparing second layer luminescence reference signal with second layer luminescence test signal to determine the second layer change in brightness; and c) correcting said change in second layer brightness for said change in first layer brightness.

17. The method of claim 16, wherein the step of correcting said change in second layer brightness for said change in first layer brightness comprises creating a pressure map of said surface.

18. A system to determine the pressure over an area of a surface of a member, comprising:

a first film disposed on the surface, wherein said first film comprises a first sensor that is adapted to emit a first light signal at a first wavelength in response to a sensed temperature of the surface;

a second film disposed over said first film, wherein said second film comprises a second sensor adapted to emit a second light signal at a second wavelength in response to a sensed pressure being exerted on the surface, said second film being optically transparent to said first light signal emitted by said first film; and detection system responsive to said first light signal and said second light signal for determining therefrom a pressure being exerted on said surface and accounting for an influence of a temperature of the surface, which temperature affects said second light signal.

19. The system of claim 18, further comprising:

a camera, wherein said camera is adapted to receive said first light signal emitted from said first sensor, and said second light signal emitted from said second sensor, and produces an output signal based on each of said light signals received; and a processor, for determining said pressure based upon said output signal from said camera.

20. The system of claim 19, wherein said camera comprises:

a first camera adapted to detect said first light signal and produce a first output signal determined by the brightness of said first light signal; and a second camera able to detect said second light signal and produce a second output signal determined by the brightness of said second light signal.

21. The system of claim 20, wherein the processor comprises:

a first processor adapted to determine a temperature based upon said first output signal from said first camera; and a second processor adapted to determine a pressure based upon said second output signal from said second camera and said temperature determined by said first processor.

22. The system of claim 18, wherein said second film is oxygen permeable, wherein the light emitted by said second sensor is dependant upon the concentration of oxygen in said second film; and wherein the magnitude of light emitted from said first sensor in said first film is dependant upon the temperature of said first film.

23. The system of claim 18, further comprising:

an illumination source adapted to excite said first sensor and said second sensor from an unexcited state to an excited state; and wherein after excitation of said first sensor and second sensor said first sensor and second sensor emit said light as said first sensor and second sensor return to their respective unexcited states.

24. A system adapted to determine a substantially error free pressure on a surface using at least one camera to detect light emitted from the surface comprising:

a first film layer surrounding the surface, wherein the first film layer emits a first light signal at a first wavelength;

a second film layer surrounding the first film layer, wherein the second film layer emits a second light signal at a second wavelength;

said first light signal has a first degree depending upon a first physical characteristic being experienced by said first film layer; and said second light signal has a second degree depending upon said first physical characteristic and a second physical characteristic experienced by the surface.

25. The system of claim 24, further comprising:

a radiation source for emitting radiation able to optically excite said first sensor and said second sensor; and an analysis system for detecting said first degree of said first light signal and said second degree of said second light signal.

26. The system of claim 25, wherein said analysis system comprises:

a first analysis system, wherein said first analysis system measures said first degree of said first light signal; and a second analysis system, wherein said second analysis system measures said second degree of said second light signal.

27. The system of claim 26, wherein said first analysis system comprises:

a camera system including a filter such that only said first light signal is detected, wherein said camera system produces a signal dependent upon said first degree of said first light signal;

a processing unit adapted to determine a magnitude of the first physical characteristic depending upon said signal produced by said camera system and to generate an output in accordance therewith; and an output device for displaying said output from said processing unit.

28. The system of claim 26, wherein said second analysis system comprises:

a camera system including a filter such that only said second light signal is detected, wherein said camera system produces a signal dependent upon said second degree of said second light signal emitted;

a processing unit adapted to determine a magnitude of the second physical characteristic depending upon said signal produced by said camera system and to generate an output in accordance therewith; and an output device capable for displaying said output from said processing unit.

29. The system of claim 24, wherein:

said first film layer comprises a first sensor and said second film layer comprises a second sensor;

wherein each said sensor comprises a chemical species which emits light having a wavelength within distinct discrete wavelengths; and wherein said first sensor is suspended in said first film layer and said second senor is suspended in said second film layer.

30. The system of claim 29, wherein said first sensor emits a degree of a first wavelength of light dependent upon a temperature incident said first 2 film layer.

31. The system of claim 29, wherein said second sensor emits a degree of light of a second wavelength dependent upon a temperature and a pressure incident said second film layer.

* * * * *